US007729968B1

(12) United States Patent
Butcher, III

(10) Patent No.: US 7,729,968 B1
(45) Date of Patent: Jun. 1, 2010

(54) METHOD FOR OBTAINING AND/OR PROVIDING A LIQUIDITY COMMITMENT

(75) Inventor: George H. Butcher, III, New Rochelle, NY (US)

(73) Assignee: Goldman Sachs & Co., New York, NY (US)

( * ) Notice: Subject to any disclaimer, the term of this patent is extended or adjusted under 35 U.S.C. 154(b) by 269 days.

(21) Appl. No.: 10/112,640

(22) Filed: Mar. 29, 2002

(51) Int. Cl.
*G06Q 40/00* (2006.01)
(52) U.S. Cl. .................... 705/36 R; 705/35; 705/37; 705/36 T
(58) Field of Classification Search ............. 705/35, 705/36, 38, 37, 36 R, 36 T
See application file for complete search history.

(56) References Cited

U.S. PATENT DOCUMENTS

| 5,704,045 | A  | * | 12/1997 | King et al. | 705/35 |
| 6,360,210 | B1 | * | 3/2002 | Wallman | 705/36 |
| 2002/0077955 | A1 | * | 6/2002 | Ramm | 705/37 |
| 2003/0040941 | A1 | * | 2/2003 | Whitworth | 705/4 |

OTHER PUBLICATIONS

Municipal Bond Prices End Session Little Changed Ahead of New Deals Sean Monsarrat and Nicholas Chesla, The Bond Buyer Wire. Bond Buyer. New York, N.Y.: Mar. 12, 2002. vol. 339, Iss. 31342; p. 2.*
Yield-Hungry Investors Find 'Short' Answer by Tom Lauricella. Wall Street Journal (Eastern edition). New York, N.Y.: Mar. 8, 2002. p. C.1.*

* cited by examiner

*Primary Examiner*—Lalita M Hamilton
(74) *Attorney, Agent, or Firm*—Chadbourne & Parke LLP; Walter G. Hanchuk

(57) ABSTRACT

One embodiment of the present invention relates to a method for structuring a debt service reserve fund, comprising: investing at least part of the debt service reserve fund in a tax-exempt investment; and obtaining a liquidity commitment on at least part of the tax-exempt investment. Another embodiment of the present invention relates to a method for providing a liquidity commitment on a debt service reserve fund, comprising: obligating a debt issuer associated with the debt service reserve fund to invest at least part of the debt service reserve fund in a tax-exempt investment; and furnishing a liquidity commitment to the debt issuer on at least part of the tax-exempt investment.

23 Claims, No Drawings

US 7,729,968 B1

METHOD FOR OBTAINING AND/OR PROVIDING A LIQUIDITY COMMITMENT

FIELD OF THE INVENTION

One embodiment of the present invention relates to a method for structuring a debt service reserve fund, comprising: investing at least part of the debt service reserve fund in a tax-exempt investment; and obtaining a liquidity commitment on at least part of the tax-exempt investment.

Another embodiment of the present invention relates to a method for providing a liquidity commitment on a debt service reserve fund, comprising: obligating a debt issuer associated with the debt service reserve fund to invest at least part of the debt service reserve fund in a tax-exempt investment; and furnishing a liquidity commitment to the debt issuer on at least part of the tax-exempt investment.

For the purposes of the present application the term "debt service" is intended to refer to certain periodic payments of interest and/or principal.

Further, for the purposes of the present application the term "debt service reserve fund" (or "DSRF") is intended to refer to a fund, account, or other mechanism used to prevent or delay a default on an obligation to pay debt service (e.g., a default on debt service associated with one or more bonds). The DSRF may be a state revolving fund ("SRF") debt service reserve fund.

Further still, for the purposes of the present application the term "program equity" is intended to include, but not be limited to, equity derived from capitalization grants and/or state matching funds. The equity may be in the form of loans and/or cash (e.g., negotiable notes, securities, etc.).

Further still, for the purposes of the present application the term "yield restricted monies" is intended to include, but not be limited to, any bond proceeds associated with one or more tax-exempt bonds (e.g., issued by a municipal issuer). Any yield earned on yield restricted monies (e.g., bond proceeds) greater than the yield of the bonds themselves must generally be turned over to the government (e.g., the Federal government). That is, any yield earned on yield restricted monies greater than the yield of the bonds themselves may generally not be retained.

Further still, for the purposes of the present application the term "direct bond proceeds" is intended to include, but not be limited to, any bond proceeds which comprise yield restricted monies and which represent direct proceeds from the sale of one or more bonds. Examples of such direct bond proceeds include, but are not limited to, proceeds from the issuance of one or more new money bonds and proceeds from the issuance of one or more refunding bonds (e.g., one or more advance refunding bonds or one or more refunding bonds other than advance refunding bonds).

Further still, for the purposes of the present application the term "deemed bond proceeds" is intended to include, but not be limited to, any monies which are not "direct bond proceeds" and which are "deemed" under the appropriate tax laws and regulations to be bond proceeds which comprise yield restricted monies. Examples of such deemed bond proceeds include, but are not limited to, pledged funds, sinking funds, and replacement funds.

Further still, for the purposes of the present application the term "restricted by regulation" is intended to include, but not be limited to, being restricted by any applicable code(s), statute(s), law(s), and/or judicial interpretation(s) which are enacted or required by a governmental or political entity (e.g., an agency of the federal, state, or local government).

Further still, for the purposes of the present application the term "an understanding" (such as an understanding between a first party and a second party, for example) is intended to include, but not be limited to, a written and/or oral: (a) agreement; (b) contract; (c) arrangement; (d) deal; (e) bargain; (f) covenant; or (g) transaction.

Further still, for the purposes of the present application the term "liquidity commitment" (such as used in the context of a liquidity commitment on a tax-exempt investment, for example) is intended to refer to an understanding for one party to purchase at least a portion of one or more DSRF investments from another party (e.g., in the event that the DSRF is required to be fully or partially liquidated in order to pay debt service associated with one or more bonds). Of note, the understanding to purchase the investment(s) may be an understanding to purchase the investment(s) at par.

Further still, for the purposes of the present application the term "investment" is intended to include, but not be limited to, one or more assets (such as cash, stock, bonds, notes, issues, obligations, inventories, property rights, or goodwill, for example).

Further still, for the purposes of the present application the term "hedge" is intended to refer to a mechanism designed to minimize and/or protect against loss by at least partially counterbalancing one transaction or position against another.

Further still, for the purposes of the present application the term "liquid" (used in the context of a liquid investment, for example) is intended to refer to being capable of ready conversion from one form to another (e.g., from a security to cash or cash equivalent).

Further still, for the purposes of the present application the term "INFLOS" is intended to refer to a proprietary financial mechanism designed to create a fixed rate liability by combining two variable rate components.

Further still, for each term which is identified herein as "intended to include, but not be limited to" certain definition(s), when such term is used in the claims the term is to be construed more specifically as "intended to include at least one of the definition(s)".

BACKGROUND OF THE INVENTION

Many municipal issuers are traditionally required to fund a debt service reserve fund ("DSRF") in connection with the issuance of their bonds. In most cases the DSRF for a bond issue represents 7% to 10% of the par amount of the issue and is funded from bond proceeds. The requirement for such reserves is typically defined as maximum or average annual debt service. In contrast, for certain types of issues the DSRF is funded from program equity and may range in size from 33% to 50% of the par amount of the issue. In either case, the DSRF would be used to prevent or delay a bond default in the event that the issuer were to default on its obligation (e.g., to annually provide revenues in an amount sufficient to pay its bonds).

More particularly, in the event that the funds provided by an issuer to pay debt service were insufficient on any payment date, the securities in the DSRF would be liquidated (to the extent required) and the proceeds thereof would be used to pay debt service. If the securities in the DSRF were liquidated at a loss, then funds available in the DSRF to prevent or delay a bond payment default would be less than anticipated (e.g., by creditors and/or rating agencies). Therefore, issuers typically keep their DSRF investments substantially shorter than the term of the bonds either because of legal requirements in their bond indentures or by policy. In either case, the restrictions on investment maturity are principally motivated by credit and rating agency concerns that the issuer limit the market risk it takes on its DSRF investments to assure that the DSRF is available to serve its function (i.e., preventing or delaying a payment default). In other words, since a municipal issuer would likely view the possibility of its own default as close to 0%, the issuer's main motivation for keeping the DSRF investment short would likely be the rating and credit concern.

If a DSRF were in fact liquidated to meet a debt service shortfall, the issuer would likely be required to both: (a) make up the deficiency in the DSRF caused by the withdrawal of funds; and (b) make up the amount of any market loss. The obligation of the issuer to do so would typically be secured by the identical security as the bonds themselves. It is believed that in the municipal market, the use by an issuer of its DSRF would be viewed as essentially tantamount to a bond default. Therefore, an issuer would prefer to avoid relying upon its DSRFs for payment if at all possible. It is believed that even a poorly rated issuer would not consider allowing a draw on its DSRFs.

Of note, a liquidity commitment provided with respect to senior bonds would in effect have priority over the payment of debt service on subordinate bonds because a deficiency in a senior DSRF is typically universally higher in the flow of funds than payments to subordinate bondholders.

Of further note, DSRFs are conventionally invested in taxable securities (such as treasuries or agencies). The yield that may be retained by an issuer on such taxable investments associated with a DSRF are typically restricted by regulation (e.g., by Federal arbitrage regulations) such that the yield may not exceed the yield on the related bonds. As discussed above, issuers generally invest in securities with a much shorter average life than their bonds. Under most market conditions, they can nevertheless earn the bond yield (i.e., the maximum yield that they can retain) on their initial investments. However, they take market risk that they will be able to earn the bond yield on reinvestments of the debt service reserve fund.

In summary, because DSRFs are typically bond funded, the issuer incurs costs to fund a DSRF and, as noted above, the issuer also has the possibility of incurring negative arbitrage when the DSRF investments mature. Accordingly, an increasing number of issuers elect to purchase a surety policy from a bond insurer to fund any required draws from the DSRF (rather than funding any required draws from the DSRF itself) Such a bond insurer surety policy generally costs 1.25% or more of the amount of the DSRF.

On the other hand, some issuers have invested in longer taxable investments and entered into a liquidity agreement for another entity to purchase the DSRF investments at par in the event that the DSRF is required to be liquidated (i.e., in order to make a payment on an issuer's bonds for which the issuer has not provided the required funds). Of note, such an issuer could not have retained earnings in excess of the bond yield. However, by essentially eliminating the possibility of negative arbitrage on the DSRF, the issuer would have fixed its cost of funding the debt service reserve fund at:

(a) the issuance cost relating to the DSRF (such cost would be about 0.5% of the amount of the DSRF) plus;

(b) the cost of the liquidity commitment.

Since, as mentioned above, an issuer's traditional alternative has been to pay about 1.25% of the DSRF for a surety, this approach could be cost effective if the liquidity agreement cost less than about 0.75% of the par amount of the DSRF or if the cost of a surety for a particular issuer would be higher than 1.25% of the DSRF. In contrast, if the liquidity agreement were to cost greater than about 5 basis points per annum, then the issuer might benefit only slightly (if at all) from the use of the taxable investments plus liquidity agreement versus the use of the surety.

In any case, neither such a traditional surety mechanism nor such a traditional taxable investment liquidity commitment mechanism provides for a liquidity commitment in connection with a tax-exempt investment associated with a DSRF, as provided for by the present invention.

DETAILED DESCRIPTION OF THE INVENTION

As required, detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment a method for structuring a debt service reserve fund is provided, comprising: investing at least part of the debt service reserve fund in a tax-exempt investment; and obtaining a liquidity commitment on at least part of the tax-exempt investment.

In one example (which example is intended to be illustrative and not restrictive) the liquidity commitment may comprise an understanding between a first party and a second party for the first party to purchase at least part of the tax-exempt investment from the second party in the event that the tax-exempt investment is required to be at least partially liquidated.

In another example (which example is intended to be illustrative and not restrictive) the liquidity commitment may further comprise an understanding between the first party and the second party for the first party to purchase at least part of the tax-exempt investment from the second party in the event that the tax-exempt investment is required to be at least partially liquidated to pay debt service.

In another example (which example is intended to be illustrative and not restrictive) the liquidity commitment may further comprise an understanding between the first party and the second party for the first party to purchase at least part of the tax-exempt investment at par from the second party in the event that the tax-exempt investment is required to be at least partially liquidated to pay debt service.

In another example (which example is intended to be illustrative and not restrictive) the liquidity commitment may further comprise an understanding between the first party and the second party for the first party to purchase all of the tax-exempt investment at par from the second party in the event that the tax-exempt investment is required to be at least partially liquidated to pay debt service.

In another example (which example is intended to be illustrative and not restrictive the liquidity commitment may further comprise obligating the second party to repurchase the part of the tax-exempt investment sold to the first party.

In another example (which example is intended to be illustrative and not restrictive) the method may further comprise obtaining a hedge on the part of the tax-exempt investment purchased by the first party.

In another example (which example is intended to be illustrative and not restrictive) the debt service reserve fund may be associated with a municipal bond issuer.

In another example (which example is intended to be illustrative and not restrictive) the debt service reserve fund may be associated with a state revolving fund bond program.

In another example (which example is intended to be illustrative and not restrictive) the debt service reserve fund may cover at least one of (but not limited to): a) a loan; b) a bond; c) an issue; and d) another obligation.

In another example (which example is intended to be illustrative and not restrictive) the method may further comprise funding the debt service reserve fund.

In another example (which example is intended to be illustrative and not restrictive) the debt service reserve fund may be funded from at least one of (but not limited to): a) direct bond proceeds; b) deemed bond proceeds; and c) program equity.

In another example (which example is intended to be illustrative and not restrictive) the debt service reserve fund may comprise yield restricted monies.

In another example (which example is intended to be illustrative and not restrictive) the step of investing at least part of the debt service reserve fund in a tax-exempt investment may further comprise investing at least part of the debt service reserve fund in a plurality of tax-exempt investments and the liquidity commitment may be on at least a part of at least one of the plurality of tax-exempt investments.

In another example (which example is intended to be illustrative and not restrictive) the step of investing at least part of the debt service reserve fund in a plurality of tax-exempt investments may further comprise investing substantially all of the debt service reserve fund in a plurality of tax-exempt investments.

In another example (which example is intended to be illustrative and not restrictive) the liquidity commitment may be on at least part of each of the plurality of tax-exempt investments.

In another embodiment a method for providing a liquidity commitment on a debt service reserve fund is provided, comprising: obligating a debt issuer associated with the debt service reserve fund to invest at least part of the debt service reserve fund in a tax-exempt investment; and furnishing a liquidity commitment to the debt issuer on at least part of the tax-exempt investment.

In one example (which example is intended to be illustrative and not restrictive) the liquidity commitment may comprise an understanding between the debt issuer and a purchaser for the purchaser to purchase at least part of the tax-exempt investment from the debt issuer in the event that the tax-exempt investment is required to be at least partially liquidated.

In another example (which example is intended to be illustrative and not restrictive) the liquidity commitment may further comprise an understanding between the debt issuer and the purchaser for the purchaser to purchase at least part of the tax-exempt investment from the debt issuer in the event that the tax-exempt investment is required to be at least partially liquidated to pay debt service.

In another example (which example is intended to be illustrative and not restrictive) the liquidity commitment may further comprise an understanding between the debt issuer and the purchaser for the purchaser to purchase at least part of the tax-exempt investment at par from the debt issuer in the event that the tax-exempt investment is required to be at least partially liquidated to pay debt service.

In another example (which example is intended to be illustrative and not restrictive) the liquidity commitment may further comprise an understanding between the debt issuer and the purchaser for the purchaser to purchase all of the tax-exempt investment at par from the debt issuer in the event that the tax-exempt investment is required to be at least partially liquidated to pay debt service.

In another example (which example is intended to be illustrative and not restrictive) the liquidity commitment may further comprise obligating the debt issuer to repurchase the part of the tax-exempt investment sold to the purchaser.

In another example (which example is intended to be illustrative and not restrictive) the method may further comprise obtaining a hedge on the part of the tax-exempt investment purchased by the purchaser.

In another example (which example is intended to be illustrative and not restrictive) the debt service reserve fund may be associated with a municipal bond issuer.

In another example (which example is intended to be illustrative and not restrictive) the debt service reserve fund may be associated with a state revolving fund bond program.

In another example (which example is intended to be illustrative and not restrictive) the debt service reserve fund may cover at least one of (but not limited to): a) a loan; b) a bond; c) an issue; and d) another obligation.

In another example (which example is intended to be illustrative and not restrictive) the method may further comprise funding the debt service reserve fund.

In another example (which example is intended to be illustrative and not restrictive) the debt service reserve fund may be funded from at least one of (but not limited to): a) direct bond proceeds; b) deemed bond proceeds; and c) program equity.

In another example (which example is intended to be illustrative and not restrictive) the debt service reserve fund may comprise yield restricted monies.

In another example (which example is intended to be illustrative and not restrictive) the step of investing at least part of the debt service reserve fund in a tax-exempt investment may further comprise investing at least part of the debt service reserve fund in a plurality of tax-exempt investments and the liquidity commitment may be on at least a part of at least one of the plurality of tax-exempt investments.

In another example (which example is intended to be illustrative and not restrictive) the step of investing at least part of the debt service reserve fund in a plurality of tax-exempt investments may further comprise investing substantially all of the debt service reserve fund in a plurality of tax-exempt investments.

In another example (which example is intended to be illustrative and not restrictive) the liquidity commitment may be on at least part of each of the plurality of tax-exempt investments.

As noted above, taxable investments in a DSRF are conventionally limited to the bond yield on the related bonds. More particularly, the yield on taxable investments that an issuer can retain is roughly equivalent to the yield of the issuer's bonds maturing at the average life of the issue (e.g., about 18 years for a 30 year issue).

On the other hand, one embodiment of the present invention provides a mechanism under which an issuer may invest in tax-exempt bonds maturing at the maturity of the bond issue (e.g., in 30 years for a 30 year issue). Thus, in one example (which example is intended to be illustrative and not restrictive) the issuer could earn and retain about an additional 20 basis points per annum on the amount of the DSRF (versus the traditional yield restricted taxable investment). In another example, the number of additional basis points per annum may vary with the term of the bond and/or the amount of issue.

More particularly, under one embodiment of the invention (which example is intended to be illustrative and not restrictive) the economics for the issuer would be defined by:

(a) the amount of tax-exempt arbitrage earned on the DSRF (e.g., about 20 basis points) minus;

(b) the cost—the issuance cost relating to the reserve (e.g. about 0.5% of the amount of the DSRF) and the cost of the liquidity commitment.

In another embodiment, as compared to a conventional method of paying a premium (e.g. about 1.25% of the DSRF) for a surety, if the issuer pays less than about 5 to 10 basis points per annum for a liquidity commitment, it is believed that the issuer would save about 10 to 15 basis points per annum on the amount of the DSRF plus the avoided up front cost (e.g., about 1.25% less 0.5% of the DSRF).

In another embodiment the issuer could sell the tax-exempt bonds (e.g., municipals) and retain the premium over par realized from the sale (e.g., if interest rates decline). If desired, the issuer could then reinvest (e.g., in treasuries and/or agencies) at a yield up to the bond yield. After such a sale, the issuer would receive DSRF earnings (net of the liquidity commitment fee) at or below the bond yield. However, the issuer would have realized essentially the full benefit of the transaction in the sale premium. Of note, while it might make economic sense to terminate the liquidity agreement at that point, such termination might undercut some of the rationale for having a liquidity agreement in the first place.

Of further note, for issues with traditional DSRFs this approach may not have conventionally been used since reserves have typically been restricted to a shorter term than the bonds. However, with the addition of default-related liquidity, it is believed that it should be possible to extend the permissible investment period to the maturity of the bonds.

Referring now to SRFs (which generally have 33% to 50% DSRFs), the reserves are typically required to have effectively the same average life as the bonds. However, in an embodiment of the present invention the issuer could earn about 50 to 75 basis points on the entire reserve by investing the longer maturities of the DSRF in a combination of INF-LOS and liquid taxable investments and/or short-term tax-exempt investments. Even in the event of a borrower default, the shorter maturing investments (which would exclusively be taxable) or the liquid taxable investments and/or short-term tax-exempt investments, as the case may be, could initially be used to fund any debt service deficiency. Until the later years (when the ratio of annual debt service to outstanding principal increases) that portion of the DSRF investments should be sufficient to fund at least one years' deficiency (provided that short-term rates are not so high that the short-term tax-exempts cannot be marketed).

In another embodiment the issuer could issue VRDBs and invest the reserve in fixed rate tax-exempt bonds. Thus the issuer could earn and retain a substantial arbitrage benefit from its DSRF. It is believed that this approach would work either for SRFs or for traditional DSRFs.

It is noted that from both the issuer's and the liquidity commitment provider's perspectives, the credit risk relating to the DSRF investments themselves could be addressed by investing only in very high quality underlying credits and/or by investing only in insured bonds. In this regard, it is noted that from the perspective of the liquidity commitment provider in particular, the credit quality of the DSRF investments may be essentially only theoretically important (provided that the issuer meets its commitment to fund debt service). In addition (and again from the perspective of the liquidity commitment provider in particular), there would be a high likelihood that any tax-exempt DSRF investments would be sold and replaced with treasuries or agencies as described above.

In another example (which example is intended to be illustrative and not restrictive) the liquidity commitment may be to purchase the DSRF investments at par to the extent required to meet a debt service insufficiency. The risk to the liquidity commitment provider associated with the liquidity commitment could be mitigated by obligating the issuer to repurchase the investments (e.g., at par) if and when the issuer fulfills its obligation to make up the DSRF shortfall. In this regard, it is noted that if the issuer's bonds are issued for water, sewer, airport, or other traditional municipal purposes, the probability of a DSRF draw is close to 0% (and even if there were a draw there would be a strong likelihood that the issuer would make up any shortfall).

Thus, at least in certain circumstances, the liquidity commitment provider would be exposed to a market risk upon the occurrence of an event that has a probability close to zero. This is different than providing bond insurance or a DSRF surety because the liquidity commitment provider's exposure upon the occurrence of the unexpected event would itself be contingent on the price of the DSRF investments in the market at the time of a call upon the liquidity commitment.

In this respect the risk is somewhat similar to the risk relating to swaps. But this liquidity commitment activity would have some significant differences from the risks relating to swaps. First, there would be no significant ongoing portfolio management risks or administrative responsibilities taken on by the liquidity commitment provider (other than the need to follow credits that would likely be followed in any event as a significant purchaser of municipal securities). Moreover: (i) the legal enforceability risks relating to the liquidity commitment are believed to be substantially lower than those relating to swaps; and (ii) the legal security for, and the real world impact of a failure of an issuer to meet: (a) its obligation to make debt service payments (e.g., the obligation which would prevent a DSRF draw); and (b) its obligation to replenish the DSRF (e.g., an obligation that would secure the issuer's repurchase obligation in the event of a DSRF draw), are believed to be significantly better for a liquidity commitment than for a swap.

In another example (which example is intended to be illustrative and not restrictive) hedging of the market risk relating to liquidity commitments using a pooled approach (e.g., hedging only 5% of the portfolio of liquidity commitments) may be utilized. It is noted, however, that such a pooled hedging approach may not be economically efficient (or useful) given: (a) the very low risk of a call upon a liquidity commitment made to a traditional municipal issuer; and (b) the likelihood that, in the event of a draw, the issuer would make up any insufficiency (and fulfill its obligation to repurchase any securities purchased by the liquidity commitment provider).

Therefore, in another example (which example is intended to be illustrative and not restrictive) hedge(s) may be utilized only in the event of a draw on a liquidity commitment. In other words, at any time that a liquidity commitment provider purchased securities under a liquidity commitment, the liquidity commitment provider could put on a hedge to ensure that, if and when the issuer repurchases the securities, the liquidity commitment provider can resell the securities to the issuer without incurring a market loss. Of note, this business practice could give the liquidity commitment provider a reasonable amount of time to work out a recovery from the issuer and to determine whether the liquidity commitment provider would ultimately incur a loss.

Of further note, it is believed that managing a swap book involves much greater legal and credit risks and much greater administration than would be associated with managing a portfolio of municipal liquidity commitments. In light of these considerations, it is believed that earning about 5 basis points as a liquidity commitment fee would seem to be equivalent to earning some larger amount (e.g., 10 basis points) on a swap (bearing in mind, of course, that swaps may create certain potential trading opportunities that might not exist with liquidity commitments).

Further still, a liquidity commitment provided hereunder may or may not be marked to market. Such marked to market processing may be carried out in spite of the highly contingent nature of the obligation by the liquidity commitment provider to purchase the DSRF investments (and given the existence of the issuer's obligation to repurchase). In this regard, if such a liquidity commitment is viewed as the sale by the liquidity commitment provider of an option, any valuation of the option should reflect the likelihood that the condition necessary for it to become exercisable will occur (recent studies indicate that the probability of a single occurrence is significantly less than 1% for major airport and water and sewer issuers).

In addition, it is noted that if liquidity were a legal requirement or if the issuer's consent were required to implement the new DSRF investment strategy according to the present invention, the issuer might want a commitment from a highly rated entity. Indeed, municipal issuers might also want a commitment from an entity with a high long-term rating. However, to the extent that an issuer's documents (e.g., bond documents) already allow long-term investments in municipals, the issuer's use of a liquidity commitment from any liquidity commitment provider provides additional comfort to which the issuer might not otherwise be legally entitled. Also, since the need to actually call on such a commitment is contingent on the issuer's default, and since the issuer would understand how unlikely it is that such an event would occur, the issuer should prefer not to pay more to obtain a high long-term rating.

In another embodiment a mechanism may be provided for facilitating variable rate refunding with the escrow invested in tax-exempt bonds, wherein the escrow is structured such that a liquidity commitment provider provides securities with a longer maturity than the refunded bonds, but with an obligation to purchase the bonds at par on the maturity date (thus providing funds on a basis sufficient to accomplish an economic defeasance of the refunded bonds).

While a number of embodiments of the present invention have been described, it is understood that these embodiments are illustrative only, and not restrictive, and that many modifications may become apparent to those of ordinary skill in the art. For example, a hedge may be put on the investment(s) purchased by the liquidity commitment provider at the time of such purchase or at any desired time thereafter. Further still, the methods described may be embodied in a software program and/or a computer system.

What is claimed is:

1. A computer implemented method for structuring a debt service reserve fund which is funded by a municipal bond issuer which issues a municipal bond having a maturity associated therewith, comprising:

investing utilizing a computer system to invest at least part of the debt service reserve fund which is funded by the municipal bond issuer in a tax-exempt investment, said tax-exempt investment having a maturity associated therewith; and obtaining utilizing the computer system to obtain a liquidity commitment on at least part of the tax-exempt investment;

wherein the liquidity commitment comprises an understanding that commits a first party to purchase at least part of the tax-exempt investment from the municipal bond issuer in the event that the tax-exempt investment is required to be at least partially liquidated to pay debt service associated with the issued bond; and wherein the liquidity commitment permits the municipal bond issuer to invest in the tax-exempt investment such that the maturity of the tax-exempt investment is substantially the same as the maturity of the issued bond.

2. The method of claim 1, wherein the liquidity commitment further comprises an understanding that commits the first party to purchase at least part of the tax-exempt investment at par from the municipal bond issuer in the event that the tax-exempt investment is required to be at least partially liquidated to pay debt service associated with the issued bond.

3. The method of claim 2, wherein the liquidity commitment further comprises an understanding that commits the first party to purchase all of the tax-exempt investment at par from the municipal bond issuer in the event that the tax-exempt investment is required to be at least partially liquidated to pay debt service associated with the issued bond.

4. The method of claim 1, wherein the liquidity commitment further comprises obligating the municipal bond issuer to repurchase the part of the tax-exempt investment sold to the first party.

5. The method of claim 1, further comprising obtaining a hedge on the part of the tax-exempt investment purchased by the first party.

6. The method of claim 1, wherein the debt service reserve fund is associated with a state revolving fund bond program.

7. The method of claim 1, wherein the debt service reserve fund is funded by the municipal bond issuer from at least one of: a) direct bond proceeds; b) deemed bond proceeds; and c) program equity.

8. The method of claim 1, wherein the debt service reserve fund comprises yield restricted monies.

9. The method of claim 1, wherein the step of investing at least part of the debt service reserve fund in a tax-exempt investment further comprises investing at least part of the debt service reserve fund in a plurality of tax-exempt investments and wherein the liquidity commitment is on at least a part of at least one of the plurality of tax-exempt investments.

10. The method of claim 9, wherein the step of investing at least part of the debt service reserve fund in a plurality of tax-exempt investments further comprises investing substantially all of the debt service reserve fund in a plurality of tax-exempt investments.

11. The method of claim 9, wherein the liquidity commitment is on at least part of each of the plurality of tax-exempt investments.

12. A computer implemented method for providing a liquidity commitment on a debt service reserve fund which is funded by a municipal debt issuer which issues a municipal bond having a maturity associated therewith, comprising:

obligating utilizing a computer system to obligate the municipal debt issuer funding the debt service reserve fund to invest at least part of the debt service reserve fund in a tax-exempt investment, said tax-exempt investment having a maturity associated therewith; and furnishing utilizing the computer system to furnish a liquidity commitment to the municipal debt issuer on at least part of the tax-exempt investment;

wherein the liquidity commitment comprises an understanding that commits a purchaser to purchase at least part of the tax-exempt investment from the municipal debt issuer in the event that the tax-exempt investment is required to be at least partially liquidated to pay debt service associated with the issued debt; and wherein the liquidity commitment permits the municipal bond issuer to invest in the tax-exempt investment such that the maturity of the tax-exempt investment is substantially the same as the maturity of the issued bond.

13. The method of claim 12, wherein the liquidity commitment further comprises an understanding that commits the purchaser to purchase at least part of the tax-exempt investment at par from the municipal debt issuer in the event that the tax-exempt investment is required to be at least partially liquidated to pay debt service associated with the issued debt.

14. The method of claim 13, wherein the liquidity commitment further comprises an understanding that commits the purchaser to purchase all of the tax-exempt investment at par from the municipal debt issuer in the event that the tax-exempt investment is required to be at least partially liquidated to pay debt service associated with the issued debt.

15. The method of claim 12, wherein the liquidity commitment further comprises obligating the municipal debt issuer to repurchase the part of the tax-exempt investment sold to the purchaser.

16. The method of claim 12, further comprising obtaining a hedge on the part of the tax-exempt investment purchased by the purchaser.

17. The method of claim 12, wherein the debt service reserve fund is associated with a state revolving fund bond program.

18. The method of claim 12, wherein the debt service reserve fund covers at least one of: a) a loan; b) a bond; c) an issue; and d) another obligation.

19. The method of claim 12, wherein the debt service reserve fund is funded by the municipal debt issuer from at least one of: a) direct bond proceeds; b) deemed bond proceeds; and c) program equity.

20. The method of claim 12, wherein the debt service reserve fund comprises yield restricted monies.

21. The method of claim 12, wherein the step of investing at least part of the debt service reserve fund in a tax-exempt investment further comprises investing at least part of the debt service reserve fund in a plurality of tax-exempt investments and wherein the liquidity commitment is on at least a part of at least one of the plurality of tax-exempt investments.

22. The method of claim 21, wherein the step of investing at least part of the debt service reserve fund in a plurality of tax-exempt investments further comprises investing substantially all of the debt service reserve fund in a plurality of tax-exempt investments.

23. The method of claim 21, wherein the liquidity commitment is on at least part of each of the plurality of tax-exempt investments.

* * * * *